United States Patent [19]

Hillman

[11] 4,089,740
[45] May 16, 1978

[54] APPARATUS FOR APPLYING SECONDARY LAYER ON BOARD SURFACE

[75] Inventor: Theodore Eugene Hillman, Cloquet, Minn.

[73] Assignee: Conwed Corporation, St. Paul, Minn.

[21] Appl. No.: 653,810

[22] Filed: Jan. 30, 1976

[51] Int. Cl.² ............................................. D21H 1/06
[52] U.S. Cl. .................................... 162/304; 162/305; 162/351
[58] Field of Search ............... 162/132, 133, 117, 205, 162/217, 225, 227, 299, 303, 304, 305, 315, 348, 351, 362; 52/516

[56] References Cited

U.S. PATENT DOCUMENTS

| | | | |
|---|---|---|---|
| 3,270,476 | 9/1966 | Ensled et al. | 52/516 |
| 3,350,260 | 10/1967 | Johnson | 162/299 X |
| 3,681,193 | 8/1972 | Nykopp | 162/304 |
| 3,775,244 | 11/1973 | Hubschmann | 162/351 |
| 3,905,864 | 9/1975 | Curry et al. | 162/133 |

FOREIGN PATENT DOCUMENTS 1,900,209  7/1970  Germany ..................... 162/132

Primary Examiner—Richard V. Fisher
Attorney, Agent, or Firm—Eyre, Mann, Lucas & Just

[57] ABSTRACT

Method and apparatus for applying a secondary layer or coating on surfaces of wet formed board materials are disclosed. The secondary layer is applied to the wet mat material of the board being manufactured during press rolling of the wet mat. The secondary layer material is supplied in the form of a slurry which is caused to adhere to the surface of a wire screen. The wire screen surface bearing the layer of slurry material is then pressed onto the mat surface to deposit the slurry layer thereon.

2 Claims, 4 Drawing Figures

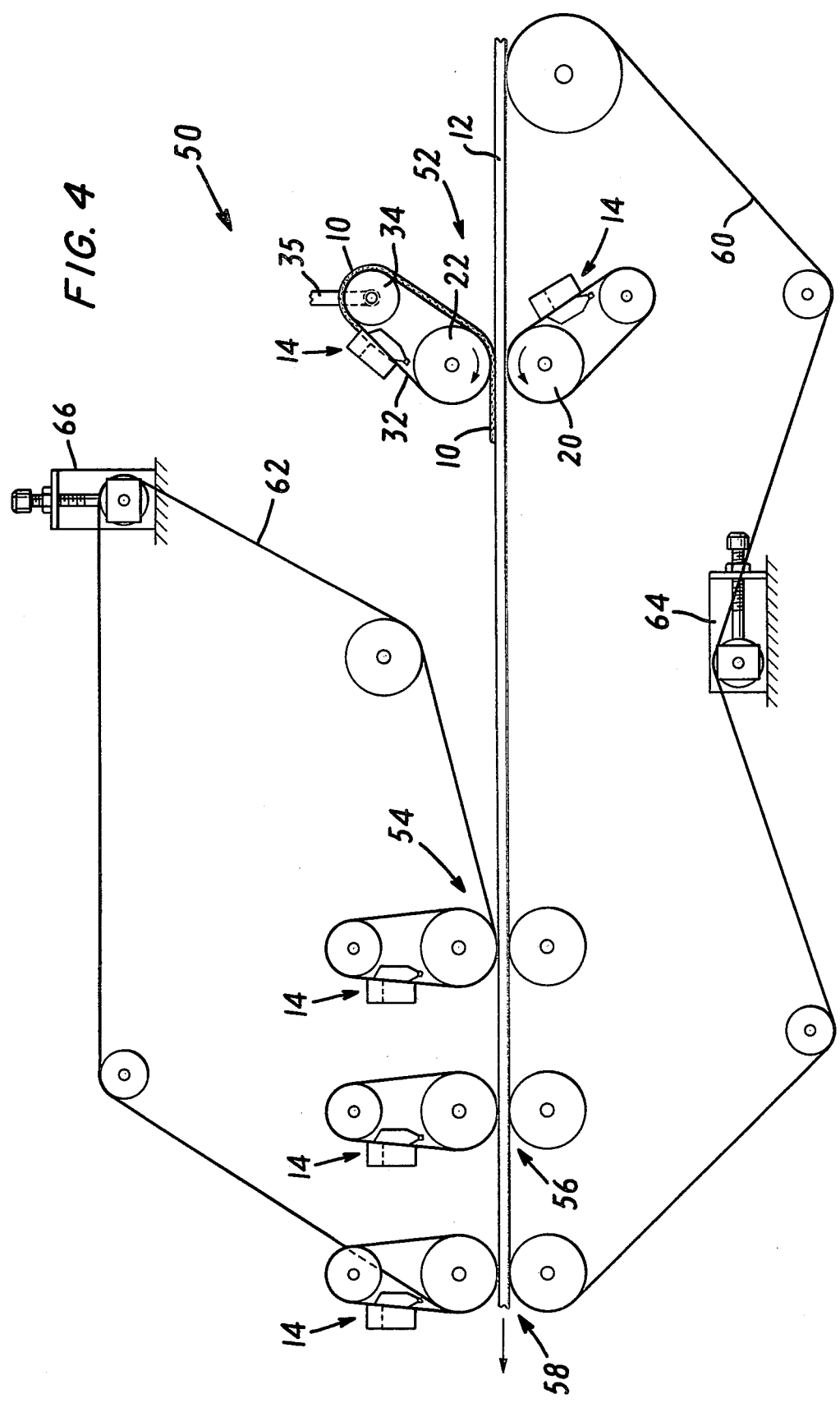

4,089,740

APPARATUS FOR APPLYING SECONDARY LAYER ON BOARD SURFACE

BACKGROUND OF THE INVENTION

1. Field of the Invention

The present invention relates to method and apparatus for applying a secondary layer or coating on surfaces of wet formed board materials.

2. Description of the Prior Art

It is known to coat pressed board to achieve various advantages over non-coated boards. For example, combustible board comprising cellulosic fibers may be coated with a fire resistant layer containing asbestos, mica or other fire resistant materials. Also, a secondary layer may be applied as a finishing coating to give an inexpensive substrate an expensive visual appearance, as, for example a wood finish on a mineral fiber board. Secondary coatings are also applied to moisture-proof inexpensive hydrophillic substrates. For example, a phenolic coating may be applied to a substrate containing starch binder. Structurally, a moisture-resistance outer layer will prevent or minimize warping of a board having a hydrophillic substrate. Other advantages to coating pressed board are apparent to those skilled in the art.

It is known to apply the secondary layer or coating by depositing slurry material directly on the substrate and screeding and pressing the deposited slurry. The product is then dried and the surface layer becomes adhered to the substrate. U.S. Pat. Nos. 3,077,945 and 3,270,476 disclose the application of a secondary layer on a board surface by a roller. The present invention is a significant advance over known apparatuses and methods in that coatings of uniform thickness, even relatively thick coatings, may be applied to board surfaces using slurries of varying consistencies, even slurries which are quite liquid.

SUMMARY OF THE INVENTION

The present invention is embodied in and carried out by a method and apparatus for applying a secondary layer or coating to surfaces of board material. The method comprises the steps of causing the material to be deposited, which is in the form of a liquid slurry, to adhere in a layer to a surface of a continuously moving perforated screen and pressing the surface of the screen having the material layer thereon onto the surface of the board to be coated. The slurry is caused to adhere to the perforated screen by passing the screen between a slurry reservoir on the one side and a vacuum on the other side. The vacuum creates a pressure differential which operates through the perforations in the screen to draw the slurry against the screen with sufficient force to cause the slurry to adhere to the screen surface in a layer as the screen is passed between the slurry and the vacuum. The perforated screen is preferably a wire screen in the form of an endless belt which is continually rotated through the slurry-vacuum boundary. Rolls are used to rotate the screen as a belt and one of the rolls is used to press the screen and slurry layer onto the board surface. The board is in the wet mat stage when the slurry layer is pressed thereon. The apparatus comprises slurry reservoir means, vacuum means positioned adjacent thereto, screen means and means to move the screen means between the reservoir means and the vacuum means, the vacuum means and reservoir means being separated by the screen means.

These and other aspects of the present invention will be more apparent from the following detailed description of the invention when considered in conjunction with the accompanying drawing.

BRIEF DESCRIPTION OF THE DRAWING

The invention is illustrated by way of example in the figures of the accompanying drawing which form part of this application and in which like numerals refer to like parts:

FIG. 4 shows diagrammatically a portion of an overall system for manufacturing board including the apparatus shown in FIGS. 1–3.

DESCRIPTION OF THE PREFERRED EMBODIMENTS

Figure 1:
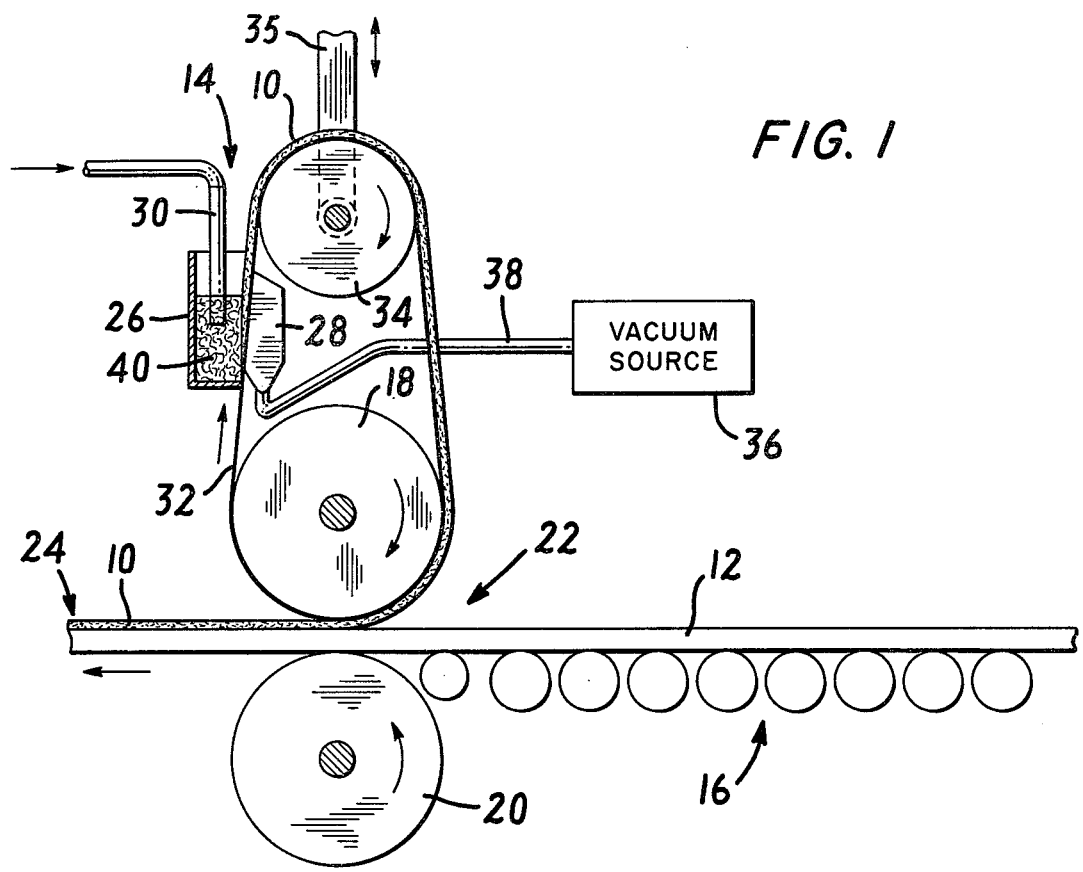
FIG. 1 shows diagrammatically apparatus according to the invention for applying a secondary layer to a board surface.

Referring to FIG. 1, a secondary coating or layer 10 is shown being applied to a board 12 by an applicator device referenced generally by 14. Board 12, in the form of a wet mat, is moved by a conveyor 16 or the like towards applicator 14. The wet mat is of known composition and may comprise mineral or cellulosic fiber, or both, and binders. Processes for forming such products are very well known in the art. The layer is being applied during the pressing operation in the manufacture of the board, as will be more apparent when reference is made to FIG. 4 herinafter. Rollers 18 and 20 comprise but one press roll station 22 in the pressing operation. After layer 10 has been applied to board 12, the composite structure 24 may continue through further pressing or directly on to other de-watering operations. The layer material is supplied in the form of a slurry and is of known composition and may comprise mineral or cellulosic fiber, or both, and binders.

The applicator device comprises stock reservoir and distribution box 26 and a suction box 28. The distribution box 26 is fed by supply conduit 30 from a source (not shown) of slurry stock material. A wire screen 32 in the form of an endless belt is wound around roller 18 and roller 34. Driving either or both rollers 18 and 34 causes screen 32 to move in belt fashion. The screen 32 is positioned to separate the distribution box 26 and the suction box 28 and serves as a common perforated wall of the two boxes. The stock material is supplied in the form of a liquid slurry and is impeded from freely entering suction box 28 by screen 32. A vacuum is provided in suction box 28 by source 36 and conduit 38. In operation, stock material 40 in the form of a slurry is caused to adhere to a surface of screen 32 in a layer 10 which is pressed onto board 12 by press rollers 18 and 20. The entire applicator device 14 is vertically adjustable by means of arm 35.

Figure 2:
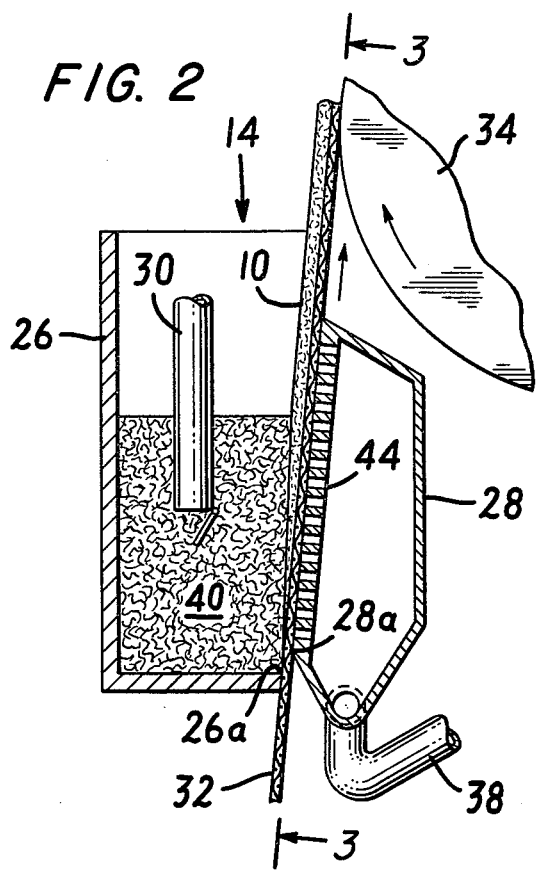
FIGS. 2 and 3 show diagrammatically in detail the portion of the apparatus of FIG. 1 for applying the layer material to a screen-type object according to the invention.
Figure 3:
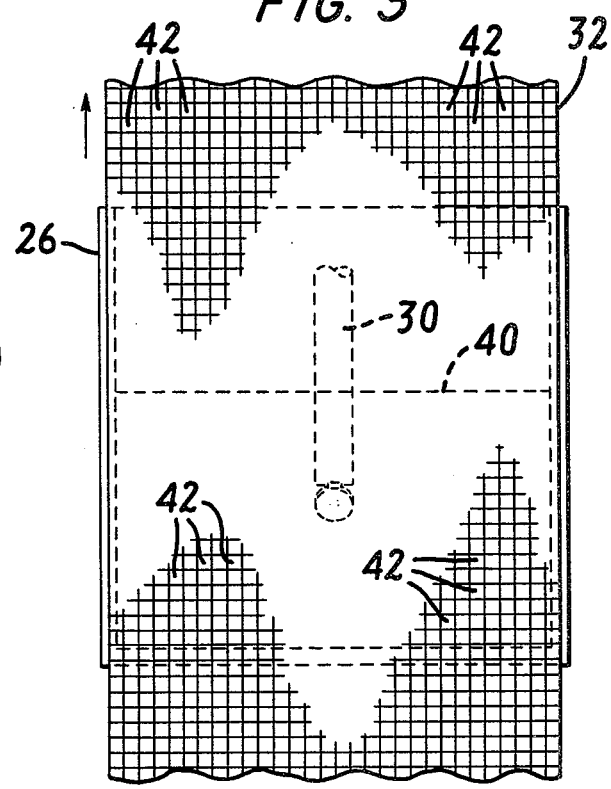

A better understanding may be had of the manner in which the stock material slurry is caused to adhere to the screen 32 by reference to FIGS. 2 and 3 in which the applicator device is shown in more detail, FIG. 3 being a view of the screen 32 and distribution box 26 taken along the screen as per line 3—3 of FIG. 2. A level of stock material slurry 40 is maintained in the distribution box 26 and screen 32 closes one side of the distribution box 26 except for screen apertures 42.

Screen 32 similarly closes off one side of suction box 28 and in effect forms a common wall between the distribution box 26 and suction box 28. Perforated support 44 is provided to support screen 32 while it passes through the stock material slurry 40 on one side and the vacuum on the other side. the vacuum existing in suction box 28 creates a pressure differential and draws the stock material 40 against the screen 32. Any liquid aspirated through the screen openings 42 into the suction box is removed therefrom through conduit 38. It is preferred that conduit 38, communicating with the vacuum source, be connected to the suction box at the lowest point thereof to provide for maximum drainage of water. The vacuum is sufficient to adhere the stock material to the screen 32 and is built up into a uniform layer as the screen passes through the stock material slurry under the continuing action of the vacuum. The layer 10 on screen 32 results. Referring to FIG. 1, the layer 10 moves with the screen 32 up and over the upper roller 34 down around pressing roller 20 to be pressed onto board 12. It is preferred that the lower wall 26a of the distribution box 26 extend beyond the lower end 28a of the suction box 28 to provide a more effective seal between the distribution box and suction box as shown in FIG. 2.

As mentioned hereinbefore, layer 10 is applied to the board 12 during the pressing operation in the manufacture of the board. Referring to FIG. 4, apparatus 50 is shown diagrammatically for pressing wet mat and may comprise several stations 52, 54, 56, and 58. The applicator device 14 may be positioned as the first pressing station 52, or, the last pressing station 58 or intermediate pressing stations 54 and 56. The board 12 in the form of wet mat is transported on a lower screen 60. At the first pressing station 52, screen 32 is employed as an upper screen and the wet mat is pressed therebetween under the action of rollers 20 and 22. As described hereinbefore, layer 10 is thereby pressed onto board 12. Further pressing is accomplished by stations 54, 56 and 58, the respective rollers pressing the composite board between upper screen 62 and lower screen 60. Where it is desirable to locate the applicator device 14 other than at the first pressing station, upper screen 62 will be routed (not shown) to bypass that station. The composite board may thereafter be moved for further de-watering. The tension of screens 60, 62 may be adjusted by means of adjustment devices 64, 66. The detailed structure of the pressing stations, rollers and upper and lower screen apparatuses, as well as further details of the pressing apparatus as a whole are well known to those skilled in the art.

The screen aperture sizes will, of course, depend upon the stock consistency as well as the magnitude of the pressure differential created by the vacuum and the desired thickness of the layer. Accordingly, the screen aperture sizes, stock consistency, screen speed, desired layer thickness and vacuum magnitude are interdependent.

The applicator device has been described with respect to location above the board to apply a secondary layer to the top side thereof. In similar manner, an applicator device may be located below the board to apply a secondary layer to the bottom thereof. However, where an applicator device is positioned below the board, as at station 54, lower screen 60 is routed (not shown) to bypass the lower applicator. It is to be understood that applicators could be positioned both above and below the board to apply secondary layers to both sides thereof. Additionally, description of the preferred embodiment has been limited to the application of a single secondary layer by any one of the application devices shown. However, multiple layers may be applied by successive applicator stations. Referring to FIG. 4, any or all of stations 54, 56 or 58 may be viewed as successive stations operative to apply multiple layers to board 12. Routing of screen 62 will be accomplished in known manner.

If desired, the applicator screen may be patterned to thereby permit a decorative or patterned layer to be formed thereon which pattern or decoration would be transferred to the surface of the board to form a patterned or decorative secondary layer thereon. To accomplish this, it is not necessary that the applicator be in the last pressing station, although this would be preferable. If applied at prior pressing stations, such a decorative or patterned layer would not be adversely affected by subsequent pressing operations. A pattern may also be applied to the secondary layer be embossing rolls if desired. If a raised or mounded secondary layer is desired on the board surface, this may be accomplished according to the invention by blocking off larger sections of the applicator screen, thereby permitting the slurry material to adhere to the screen in other than a smooth layer, and then pressing the raised or mounded screen layer onto the board.

While the rollers have been shown to rotate and the board to move in designated directions, it is understood that these directions may be reversed.

The advantages of the present invention, as well as certain changes and modifications of the disclosed embodiment thereof, will be readily apparent to those skilled in the art. It is the applicant's intention to cover by his claims all those changes and modifications which could be made to the embodiment of the invention herein chosen for the purposes of the disclosure without departing from the spirit and scope of the invention.

What is claimed is:

1. Apparatus for applying a secondary layer in the form of a slurry to a pressed board product in the wet mat state comprising:
   (a) an endless belt having a first surface having a plurality of perforations therethrough;
   (b) slurry reservoir means;
   (c) vacuum means positioned adjacent said reservoir means and separated therefrom by said belt;
   (d) drive means for rotating said endless belt and moving it between said reservoir and vacuum means whereby the vacuum creates a pressure differential which acts through the perforations to draw the slurry in the reservoir against the moving first surface, the vacuum being sufficient to cause the slurry to build on and adhere to the moving first surface in a layer said drive means being a first pair of rollers about which said belt rotates, at least one of said first pair of rollers being driven;
   (e) pressing means for pressing said first surface and layer thereon on said wet mat product to thereby apply the slurry layer on said first surface to the wet mat product and
   (f) said pressing means being at least one pair of opposed pressing rollers and support means to support and move said wet mat product therebetween, said first pair of rollers and said pair of pressing rollers having a common roller and said pair of pressing rollers being positioned to pass said belt between said one common roller and said product to press said first surface and layer thereon.

2. In a system for the wet forming of a board product, the improvement comprising an apparatus for applying a secondary layer in the form of a slurry to the board product while it is still wet, said apparatus comprising:
(a) a moving surface having a plurality of perforations therethrough;
(b) means for adhering the slurry to said moving surface as a layer thereon;
(c) said means for adhering being a slurry reservoir, vacuum means and moving means to move said moving surface between said slurry reservoir and said vacuum means;
(d) pressing means for pressing said moving surface and layer on the board product to thereby apply the slurry layer thereon;
(e) said moving surface being an endless belt, and said moving means being a first pair of rollers, at least one of said rollers being driven to move said moving surface between said slurry reservoir and said vacuum means; and
(f) said pressing means being at least one second pair of opposed pressing rollers and means to support and move the board product therebetween, said first pair and said at least one second pair of rollers having one common roller, and said belt and first pair of rollers being positioned to pass said belt between said one common roller and the board product.

* * * * *